March 20, 1945.  A. O. RYAN  2,372,162

CABLE FORMING APPARATUS

Filed May 15, 1943

INVENTOR.
ALBERT O. RYAN
BY
ATTORNEY

Patented Mar. 20, 1945

2,372,162

UNITED STATES PATENT OFFICE 2,372,162

CABLE FORMING APPARATUS

Albert O. Ryan, River Edge, N. J., assignor to Federal Telephone and Radio Corporation, Newark, N. J., a corporation of Delaware Application May 15, 1943, Serial No. 487,080

11 Claims. (Cl. 18—13)

This invention relates to improvements in cable forming apparatus, and more particularly to apparatus for controlling the size of extruded insulated cable.

An object of the present invention is to provide improved means for accurately controlling the size of extruded insulated cable.

Another object of this invention is to provide extruded insulated cable size-controlling apparatus which is simple and readily adjustable as a control unit for various sizes of cable.

A further object of the present invention is to provide apparatus for accurately controlling the size of extruded cable, which is relatively insensitive to small protuberances on the cable but which will measure and correct for all large variations and all small and gradual size changes.

More specifically, the apparatus according to the present invention controls the size of extruded insulated cable by continuously measuring the average size of continuously varying preselected lengths of cable as it comes from the extruder.

An illustrative embodiment disclosing one form of the invention together with a modified control unit is shown in the accompanying drawing in which.

It is already known to extrude various forms of insulation about a bare wire core to form insulated cable. In such instances, the insulated cable coming from the extruder is generally passed through pulling rollers which draw the cable from the extruding head. For any particular size extruding head, the size of the cable as determined by the thickness of the insulation thereon, is affected by the speed at which the insulated cable is drawn from the extruder. The faster the speed the thinner will be the insulation, while the slower the speed the thicker will be the insulation. Despite the fact that the speed of pulling the cable can be carefully controlled, as well as can the conditions within the extruder, nevertheless variations in the thickness of insulation occurring which for high frequency cable cause relatively large changes in total cable impedance. In accordance with the present invention I provide means whereby any changes in cable size due to changes in thickness of the extruded insulation may be quickly detected and compensated for.

Figure 1:
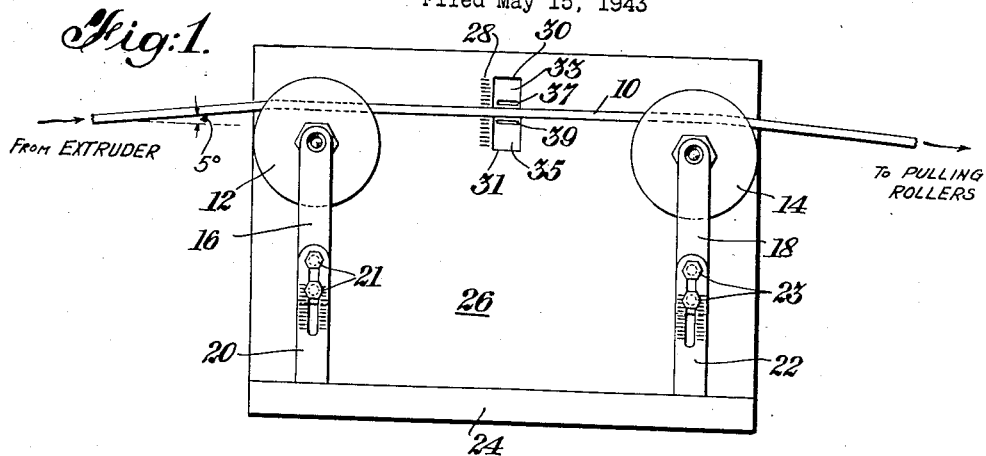
Fig. 1 is a front view of cable size controlling apparatus according to the present invention, showing its relationship to the cable as it passes from the extruder to the pulling rollers.

In Fig. 1 a general view of the proposed system is illustrated. The cable 10 coming from the extruder and going to the pulling rollers is passed over a pair of longitudinally spaced grooved rollers 12 and 14. In order that the cable shall fit firmly into the rollers it is desirable to have a slight tension on the cable, and for this purpose the rollers may be adjusted so that leading up to them the cable will normally extend at an angle, for example, 5° or more. The rollers 12 and 14 are preferably mounted on yokes 16 and 18 respectively, which are adjustably supported in slotted mounts 20 and 22 by suitable means such as screws 21 and 23. The mounts 20 and 22 may, in turn, be supported upon a suitable base 24.

Attached to the base 24 or held separately but in predetermined relationship therewith, is a control panel 26 which, first of all, may be provided with a scale 28 positioned behind the section of the cable 10 passing between the spaced rollers. The panel 26 may also be provided with cut-out portions 30 and 31 behind which are positioned adjustable boxes 33 and 35 each containing light-controlling slits 37 and 39 and adapted to be placed on opposite sides of the cable 10.

Figure 2:
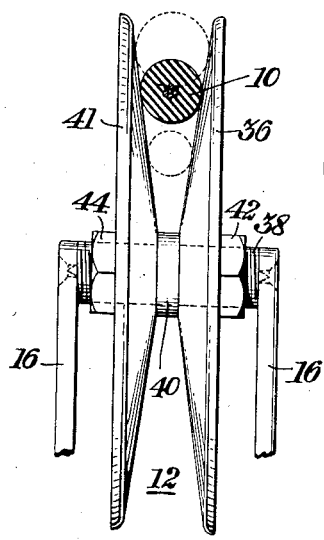
Fig. 2 is an enlarged side view of one of the rollers used in the apparatus shown in Fig. 1.

The rollers 12 and 14 are grooved and preferably formed in an adjustable manner as indicated in Fig. 2. As will there be seen, each roller or pulley may be formed of two disks or flanges 34 and 36 having opposite conical faces forming a groove between them The disks 34 and 36 are suitably mounted on a shaft 38 and spaced from one another by a suitable spacer 40. The disks 34 and 36 together with the spacer 40 are rigidly held on the shaft 38 by any suitable means such as nut collars 42 and 44 which may be threaded on the shaft 38 squeezing the disks 34 and 36 and the intermediate spacer 40 between them.

From a study of the construction illustrated in Fig. 2 it will be noted that as the cable 10 passes between the rollers 12 and 14 under tension, it will assume a position in the groove which is dependent upon its size. According to the present invention it is proposed that for the normal size of the cable to be produced, the same will assume an intermediate position in the formed roller groove. If the size of the cable is smaller than desired it will fall inwardly into the groove, while if it is larger than desired it will ride near the outer end of the groove. This action results, as between the rollers 12 and 14, in an arrangement in which the cable 10 will be in a normal straight line between the two rollers, which line will be substantially parallel to a line connecting the axes of the rollers. As the cable decreases in size this straight line will fall nearer the axes of the rollers, while if the cable becomes larger than normal this straight line cable section will rise, or move outwardly from the roller axes. Thus, it will be seen that the position of the straight line section of the cable 10 between the rollers 12 and 14 is a measure of the size of the cable being extruded, while at the same time slight bumps or protuberances on the cable, which are relatively unimportant since they can be quickly checked and corrected, will have little effect upon the movement of this straight line section, which movement is controlled, rather, by the average size of cable over the unit length as determined by the spacing of the two pulleys or rollers.

The position of the straight line section of the cable between the rollers 12 and 14, being a measure of the size of the cable, can be read by a suitable scale or other indicia 28 positioned on the panel 26 behind the cable, and thus advise the operator whether the cable is averaging correct size, too large, or too small. At the same time, the in and out movement of this straight line section may also be used to control and compensate for any variations in cable size. While various means for detecting and utilizing this movement of the cable section will occur to those skilled in this art, according to one embodiment of the present invention I prefer to accomplish this by the use of light-sensitive cells which are positioned behind slits on opposite sides of the cable. This apparatus is shown more clearly in Fig. 3. As there indicated, the panel 26 is provided with a pair of openings 30 and 31 behind which are respectively positioned boxes or other enclosures 33 and 35 each provided with a small slit 37 and 39. Within each of the boxes is mounted a photo-electric cell 47 and 48. On the other side of the cable is positioned a light source such as a lamp 49, the rays from which are reflected toward the slots 37 and 39 in substantially parallel lines by means of a suitable reflector 50. The light rays passing through the slits 37 and 39 may be deflected toward their respective light-sensitive devices by mirrors 45 and 46. In the position of the parts shown, which is assumed to be a position taken by a cable of the size desired, both light-sensitive devices 47 and 48 will be energized since the cable in its mid-position does not block the light through either of the slits 37 and 39. If, however, the cable is too large in diameter, the straight line section between the two pulleys or rollers will rise, block the light passing through the slit 37 and de-energize the light-sensitive device 47. On the other hand, if the cable is smaller than desired, the straight line section between the pulleys will move downwardly blocking the slit 39 and de-energizing the light-sensitive device 48. It is contemplated, of course, that the slits 37 and 39 are spaced from the normal position of the cable 10 to an extent determined by the permissible tolerances in cable size and for this reason the boxes may be made vertically adjustable in any known manner. The light-sensitive devices 47 and 48 are respectively connected to amplifiers 54 and 56 which, in turn, respectively lead to the operating coils of normally energized relays 58 and 60.

Figure 3:
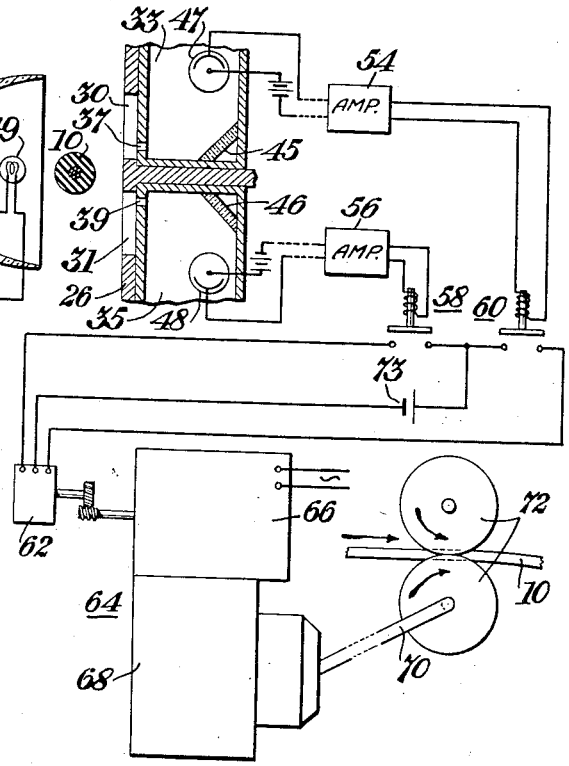
Fig. 3 shows a partial cross-sectional portion of the control panel shown in Fig. 1, together with a circuit diagram of a control circuit which may be used with the present invention.

As was mentioned previously, the cable is generally pulled from the extruder by means of suitable rollers which may be driven by a power source through a variable speed drive. In Fig. 3, the driving unit is generally indicated at 64 and may consist of a motor 66 connected to a variable transmission 68 which may be, for example, of the well-known type in which a belt is driven between pulleys whose diameter may be controlled to change the driving ratio. As the details of such a control unit are well-known in the transmission art, it is not believed that any further information with respect to such a drive is necessary. From this variable speed drive a shaft 70 may lead to the pulling rollers 72. A pilot motor 62 of the reversible type controls the position of the movable pulley disks in the transmission. The direction of rotation of the reversible motor 62 is under the control of the normally energized relays 58 and 60 which connect the source of power 73 to the motor 62 in one sense or the other depending upon which relay is closed. For example, if the cable is larger than desired, the slit 37 as previously explained will be covered, and the light-sensitive device 47 de-energized. As a result the relay 60 will close, energizing the reversible motor 62 in a direction to change the variable speed control to increase the speed of the rollers 72 and thus reduce the diameter of the cable being extruded. If the size of the cable 10 is too small and it covers the slit 39, deenergizing the light-sensitive device 48 and the relay 58, the reverse action will take place.

One of the features of the present invention lies in the adaptability of the control apparatus for various sizes of cables and various tolerances in cable size. This is the result of several factors. The construction of the rollers 12 and 14 will, by utilizing different sizes of spacers 40, provide different size grooves to accommodate different size cables. Since different size cables will require different tensioning, the rollers themselves are mounted upon adjustable supports as previously described. Since different size cables will also require different spacings of the control slits 37 and 39 leading to the light-sensitive device, the boxes 33 and 35 containing the light-sensitive devices and the control slits may be mounted adjustably behind the wide openings 30 and 31 in the control panel 26. Various arrangements (not shown) will occur to those skilled in this art for re-positioning the boxes 33 and 35 as required. A re-positioning of the control slits 37 and 39 is also necessary to give various tolerances in cable size as required. It will also be noted that the slope of the conical faces of the disks 34 and 36 of the rollers is a determining factor in the amount of movement for change in cable size which will occur in the straight line portion of the cable between the two rollers. Accordingly, the apparatus is subject to further adjustment by substituting disks having various slopes depending upon the tolerances in cable sizes and the sensitivity of control desired.

Figure 4:
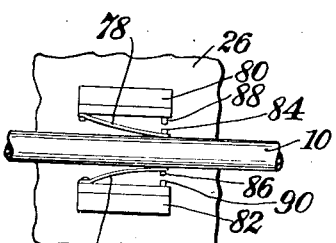
Fig 4 is an enlarged partial front view of a modified control unit which may be used in place of the unit shown in Fig. 1.

It is contemplated according to this invention that any suitable means for detecting movement of the straight line portion of the cable between the two controlling portions may be used to detect and effectively control the size of cable. While in Figs. 1 and 3 I have illustrated, by way of example, an arrangement in which light-sensitive devices are used for this purpose, other arrangements will occur to those skilled in this art. Another example of a suitable control device is illustrated in Fig. 4. Here the straight line section of the cable 10 passes through a pair of light springs 78 and 79 respectively mounted on what may be adjustable bases 80 and 82. The lower ends of the springs 78 and 79 are formed with contacts 84 and 86 respectively, which will be spaced from contacts 88 and 90 by an amount equal to the tolerances in cable size desired. As the straight line portion of the cable moves upwardly or downwardly, as seen in the drawing, either the contact pair 84, 88 or 86, 90 will close when the limits of desirable tolerance have been reached. The closing of either pair of contacts may close control circuits, such as for the relays 58 and 60 in Fig. 3, to effect a change in the speed of the pulling rollers in the manner previously described. The stationary contacts 88 and 90 also may be made adjustable to give variations in tolerance, if desired. The control relays may be such as to respond only to closure of the contacts for a predetermined time so that the control will not respond to every small projection on the cable insulation.

While I have described above the principles of my invention in connection with certain apparatus and modifications thereof, it is to be clearly understood that this description is made only by way of example and not as a limitation on the scope of my invention as set forth in the objects and the accompanying claims.

I claim:

1. In a system for forming insulated cables of the type in which insulation is extruded about a wire core in an extrusion head and means are provided for pulling the insulated cable under tension from the extrusion head, including means for controlling the pulling speed, the combination of a pair of spaced-apart grooved pulleys over which the cable passes from the extrusion head to the pulling means, the grooves in each pulley being of variable width, increasing from the center of the pulley outwardly and so dimensioned relatively to the cable that the latter will ride in an intermediate radial position in the groove for a desired cable size, whereby the cable will shift radially in each pulley and in a straight line between the pulleys depending upon its size, means positioned between the two pulleys for detecting variations in the size of the cable by changes in the position of the straight line portion between the pulleys, and means responsive to said detecting means for varying said speed control means.

2. The combination according to claim 1, in which said detecting means includes a pair of light-sensitive devices positioned on opposite sides of the normal straight line position of the cable between the pulleys, and a light source normally energizing said light-sensitive device and so positioned relatively thereto that movement of the cable out of its normal straight line position will interrupt the energization of one of the said light-sensitive devices, and in which the speed varying means comprises a reversible motor drivably connected to vary said speed control means, a source of power for said reversible motor, and alternate means operated by one or the other of said light-sensitive devices for connecting said source of power to said reversible motor for operating the same in one direction or other.

3. The combination according to claim 1, in which said detecting means includes a pair of circuit-closing means positioned on opposite sides of the normal straight line portion of the cable between the pulleys and actuated whenever said cable moves from its normal straight line position, and in which the speed varying means comprises a reversible motor drivably connected to vary said speed control means, a source of power for said reversible motor, and alternative means operated by one or the other of said circuit-closing means for connecting said source of power to said reversible motor for operating the same in one direction or another.

4. In a system for forming insulated cables of the type in which insulation is extruded about a wire core in an extrusion head and means are provided for pulling the insulated cable under tension from the extrusion head, the combination of a pair of spaced-apart grooved pulleys over which the cable passes from the extrusion head to the pulling means, the grooves in each pulley being of variable width, increasing from the center of the pulley outwardly and so dimensioned relatively to the cable that the latter will ride in an intermediate radial position in the groove for a desired cable size, whereby the cable will shift radially in each pulley and in a straight line parallel to a line interconnecting the axes of the pulleys, depending upon its size, and means positioned between the two pulleys and adjacent the cable running between them for detecting changes in position of the straight line section and thus detecting changes in cable size.

5. The combination according to claim 4, in which said last means is a scale having indicia thereon extending across the straight line portion of the cable between the pulleys.

6. The combination according to claim 4, in which said detecting means includes a pair of light-sensitive devices positioned on opposite sides of the normal straight line position of the cable between the pulleys, and a light source normally energizing said light-sensitive device and so positioned relatively thereto that movement of the cable out of its normal straight line position will interrupt the energization of one of the said light-sensitive devices.

7. The combination according to claim 4, in which each of said pulleys comprises two flanges having oppositely directed substantially conical faces, a common mounting for said flanges, and spacing means between the two flanges, whereby the two conical faces form between them a groove of varying width determined by the width of the spacing member.

8. In apparatus for controlling the size of insulated cable, in which the insulation is applied from an extrusion head and means are provided for pulling said insulated cable from the extrusion head, including a motor and a variable speed drive intermediate said motor and said pulling means, the combination of a pair of spaced-apart grooved pulleys over which the cable passes under tension from the extrusion head to the pulling means, the groove in each pulley being of variable width increasing from the center outwardly and so dimensioned relatively to the cable that the latter will ride in an intermediate radial position in the grooves when the insulation is of a desired diameter, whereby the cable will shift radially in the grooves of each pulley and in a straight line parallel to a line interconnecting the axes of the pulleys, depending upon the outer diameter of the insulation, means positioned between the two pulleys and adjacent the cable running between them for detecting changes in the position of the straight line section, and means controlled by said detecting means for varying said variable speed drive.

9. Apparatus according to claim 8, in combination with means for adjustably mounting said pulleys for adjustment transversely to said line.

10. The combination according to claim 8, in which said detecting means includes a pair of light-sensitive devices positioned on opposite sides of the normal straight line position of the cable between the pulleys, and a light source normally energizing said light-sensitive device and so positioned relatively thereto that movement of the cable out of its normal straight line position will interrupt the energization of one of the said light-sensitive devices.

11. The combination according to claim 8, in which said detecting means includes a pair of circuit-closing means positioned on opposite sides of the normal straight line portion of the cable between the pulleys and actuated whenever said cable moves from its normal straight line position.

ALBERT O. RYAN.